(12) United States Patent
Gianone et al.

(10) Patent No.: US 9,377,099 B2
(45) Date of Patent: Jun. 28, 2016

(54) TRANSMISSION SYSTEM

(71) Applicant: Meritor Technology, Inc., Troy, MI (US)

(72) Inventors: Roberto Gianone, Barengo (IT); Chiara Cesari, Novara (IT); Marco Bassi, Novate Milanese (IT); Marco Fratelli, Vigevanoo (IT)

(73) Assignee: Meritor Technology, Inc., Troy, MI (US)

( * ) Notice: Subject to any disclaimer, the term of this patent is extended or adjusted under 35 U.S.C. 154(b) by 193 days.

(21) Appl. No.: 14/039,447

(22) Filed: Sep. 27, 2013

(65) Prior Publication Data

US 2014/0020984 A1 Jan. 23, 2014

Related U.S. Application Data

(63) Continuation of application No. 12/824,449, filed on Jun. 28, 2010, now abandoned.

(51) Int. Cl.
*F16H 57/04* (2010.01)

(52) U.S. Cl.
CPC ........ *F16H 57/0436* (2013.01); *F16H 57/0447* (2013.01); *F16H 57/045* (2013.01); *F16H 57/0409* (2013.01); *F16H 57/0483* (2013.01); *Y10T 74/2186* (2015.01); *Y10T 74/2188* (2015.01)

(58) Field of Classification Search
CPC ............ F16H 57/0436; F16H 57/0447; F16H 57/0409; F16H 57/045; F16H 57/0483; Y10T 74/2186; Y10T 74/2188

USPC ........................................................ 184/6.12
See application file for complete search history.

(56) References Cited

U.S. PATENT DOCUMENTS

| | | | |
|---|---|---|---|
| 3,800,913 A | | 4/1974 | Schmitt |
| 4,095,675 A | | 6/1978 | Bell |
| 4,169,519 A | * | 10/1979 | Hirt et al. ........................ 184/6.3 |
| 4,242,923 A | | 1/1981 | Nishikawa et al. |
| 4,244,242 A | | 1/1981 | Uno et al. |
| 4,261,219 A | | 4/1981 | Suzuki et al. |
| 4,352,301 A | | 10/1982 | Fleury |
| 4,368,802 A | | 1/1983 | Grabill et al. |
| 4,468,981 A | | 9/1984 | Ries |
| 4,489,626 A | | 12/1984 | Lemon |
| 4,658,665 A | | 4/1987 | Strinzel et al. |

(Continued)

FOREIGN PATENT DOCUMENTS

| | | |
|---|---|---|
| DE | 3714087 | 11/1987 |
| EP | 1918613 | 5/2008 |

(Continued)

OTHER PUBLICATIONS

United Kingdom Search Report for GB0911281.4 dated Oct. 28, 2009.

*Primary Examiner* — Michael Riegelman
(74) *Attorney, Agent, or Firm* — Brooks Kushman P.C.

(57) ABSTRACT

A transmission system includes a housing having a sump, the housing containing a crown wheel and a pinion. The transmission system further includes an oil reservoir and a pump selectively operable to pump fluid from the oil reservoir to the sump for lubricating the crown wheel. The pump is selectively operable to pump fluid from the sump to the reservoir.

14 Claims, 6 Drawing Sheets

(56) References Cited

U.S. PATENT DOCUMENTS

| | | | |
|---|---|---|---|
| 4,736,819 A * | 4/1988 | Muller | 184/6.12 |
| 4,751,858 A | 6/1988 | Iwatsuki | |
| 4,915,193 A * | 4/1990 | Marquart | 184/6.12 |
| 5,115,887 A | 5/1992 | Smith | |
| 5,505,112 A * | 4/1996 | Gee | 74/606 R |
| 5,662,188 A * | 9/1997 | Ito et al. | 184/6.3 |
| 6,092,628 A * | 7/2000 | Hinton et al. | 184/6.22 |
| 6,132,329 A | 10/2000 | Tison | |
| 6,189,655 B1 | 2/2001 | Scheib et al. | |
| 6,227,333 B1 | 5/2001 | Scheib et al. | |
| 6,267,203 B1 | 7/2001 | Brissette et al. | |
| 6,299,561 B1 | 10/2001 | Kramer et al. | |
| 6,644,439 B2 * | 11/2003 | Schnitzer | 184/11.1 |
| 6,718,847 B2 * | 4/2004 | Rimkus et al. | 74/606 R |
| 6,843,746 B2 | 1/2005 | Hayes et al. | |
| 6,928,976 B2 * | 8/2005 | Håkansson | 123/196 R |
| 7,686,137 B2 | 3/2010 | Tominaga et al. | |
| 7,779,725 B2 | 8/2010 | Eschenburg | |
| 7,878,304 B2 | 2/2011 | Reis et al. | |
| 7,892,131 B2 | 2/2011 | Hilker et al. | |
| 7,963,875 B2 | 6/2011 | Hilker et al. | |
| 2003/0059310 A1 | 3/2003 | Koenig et al. | |
| 2007/0251348 A1 | 11/2007 | Hayes et al. | |
| 2013/0001017 A1 * | 1/2013 | Saenz De Ugarte Sevilla et al. | 184/6.12 |
| 2013/0074630 A1 * | 3/2013 | Jarvinen et al. | 74/467 |
| 2013/0133454 A1 * | 5/2013 | Barthel et al. | 74/468 |
| 2014/0026988 A1 * | 1/2014 | Peterson et al. | 137/544 |
| 2014/0172250 A1 * | 6/2014 | Tamai et al. | 701/51 |
| 2014/0231209 A1 * | 8/2014 | Nett et al. | 192/85.01 |

FOREIGN PATENT DOCUMENTS

| | | |
|---|---|---|
| GB | 1322585 | 7/1973 |
| GB | 2455198 | 6/2009 |

* cited by examiner

TRANSMISSION SYSTEM

REFERENCE TO RELATED APPLICATION

This application is a continuation of U.S. application Ser. No. 12/824,449 filed Jun. 28, 2010, which claims priority to United Kingdom Application No. GB 0911281.4 filed Jun. 30, 2009.

BACKGROUND OF THE INVENTION

The present invention relates to a transmission system, in particular to a transmission system including a crown wheel and a pinion, especially a transmission system including a crown wheel and a pinion in an axle housing.

A driven axle for automotive vehicles are known whereby a drive shaft aligned generally longitudinally relative to the vehicle drives a pinion which is in meshing engagement with a crown wheel in an axle housing. The crown wheel drives a right hand drive shaft connected to a right hand wheel and also drives a left hand drive shaft connected to a left hand wheel, thereby propelling the vehicle. Typically, the crown wheel will drive the right and left hand drive shafts via a differential assembly.

Oil is provided in the axle housing for lubricating and cooling the crown wheel, a pinion, differential gears and associated bearings. However, the rotation of the crown wheel, the pinion and a differential housing in the oil leads to power losses, thereby increasing the overall fuel consumption of the vehicle.

U.S. Pat. No. 6,299,561 shows a crown wheel which, as it rotates, splashes oil over a wall of the associated housing. A hole in a lower portion of the wall allows oil to drain back to an area where it can again lubricate the crown wheel. In an alternative embodiment, the hole may be replaced by a selectively operable valve. Both embodiments rely on the region surrounding the crown wheel to be emptied by the action of the crown wheel turning. Such a system is not always reliable under certain operating conditions, especially when the crown wheel is turning slowly. It also relies on the various internal surfaces of the housing being arranged to ensure that oil lifted by the crown wheel goes over the wall into the adjacent compartment, rather than simply falling back down into the compartment within which the crown wheel sits.

EP1918613 shows a prefabricated shield fitted around at least a potion of the crown wheel. Oil is splashed out of the region around the crown wheel into another part of the axle housing, and the shield prevents the oil returning to a region where it can lubricate the crown wheel. A valve can be selectively opened to allow oil back into the region around the crown wheel under certain circumstances. Thus, EP1918613 also relies on the crown wheel splashing oil out, in a manner similar to U.S. Pat. No. 6,299,561, and therefore under certain driving conditions will not reliably causes the oil level in the region of the crown wheel to fall.

There is therefore a requirement for an improved transmission assembly.

SUMMARY OF THE INVENTION

Thus, according to the present invention, there is provided a transmission system including a housing having a sump. The housing contains a crown wheel and a pinion, and part of the crown wheel is received in part of the sump. The transmission system further includes a reservoir and a pump system selectively operable to pump fluid from the reservoir to the sump to increase the oil level in the sump. The pump system also is selectively operable to pump fluid from the sump to the reservoir to decrease the oil level in the sump.

Advantageously, a system which is capable of pumping fluid from the reservoir to the sump and is also capable of pumping fluid from the sump to the reservoir no longer relies on the rotational speed of the crown wheel, internal geometry of the housing, or the temperature and viscosity of fluid to lower the level of fluid in the region of the crown wheel. Such a system can vary the fluid level in the sump from a relatively low level where the fluid is at a level higher than the bottom of the crown wheel to a relatively high level where the fluid is at a level higher than the bottom of the crown wheel. In this way, the crown wheel will be continuously lubricated, because the fluid level is higher than the bottom of the crown wheel under normal circumstances, but more fluid will be present when the fluid level is relatively high, and less fluid will be present when the fluid level is relatively low.

In one embodiment, the pump system may include a pump which is driven in a first direction to pump fluid from the reservoir to the sump, and the pump is driven in a second direction to selectively pump fluid from the sump to the reservoir. Advantageously, such a system only requires a single pump.

In another embodiment, the pump system may include a pump and a first flow diverter valve upstream from the pump selectively operable to connect the pump to one of the reservoir and the sump and a second flow diverter valve downstream from the pump selectively operable to connect the pump to the other of the reservoir and the sump. Advantageously, such a system only required a single pump, and the pump is only required to be driven in one direction.

In another embodiment, the pump system may include a first pump selectively operable to pump fluid from the reservoir to the sump and a second pump being selectively operable to pump fluid from the sump to the reservoir. Advantageously, such a system does not require fluid diverter valves, nor does it require any of the pumps to be operated in a forward and reverse direction.

In one embodiment, an inlet for the pump system may be positioned in the sump at a level higher than the bottom of the crown wheel. Advantageously, when the pump system is being operated to selectively pump fluid from the sump to the reservoir to decrease the fluid level in the sump, the sump can only be emptied down to the level of the inlet for the pump. Significantly, it is not possible to pump the sump dry of fluid because the inlet for the pump is positioned at a level above the bottom of the sump, and at a level above the bottom of the crown wheel. Where a single pump is driven in opposite directions, the inlet for the pump when it is being used to selectively pump fluid from the sump to the reservoir acts as a pump outlet when the pump selectively operates to pump fluid from the reservoir to the sump. Where a single pump is operated in conjunction with fluid diverter valves, the inlet positioned in the sump is one of two dedicated inlets for the pump, the other inlet being positioned in the reservoir. Where the pump system includes a first pump selectively operable to pump fluid from the reservoir to the sump and the second pump being selectively operable to pump the fluid from the sump to the reservoir, the inlet positioned in the sump at a level higher than the bottom of the crown wheel is an inlet for the second pump.

According to a further aspect of the present invention, a method of operating a transmission system includes the steps of providing the transmission system including a housing having a sump, the housing containing a crown wheel and pinion. Part of the crown wheel is received in part of the sump. The transmission system further includes a reservoir and a pump system. The method further including the steps of selectively operating the pump system to pump fluid from the reservoir to the sump to increase the oil level in the sump and selectively operating the pump system to pump fluid from the sump to the reservoir. In one example, when the pump system is selectively operated to pump fluid from the sump to the reservoir to decrease the oil level in the sump, the oil level in the sump is only decreased to a level above the bottom of the crown wheel.

BRIEF DESCRIPTION OF THE DRAWINGS

The invention will now be described, by way of example only, with respect to the accompanying drawings in which.

DETAILED DESCRIPTION OF THE PREFERRED EMBODIMENT

Figure 1:
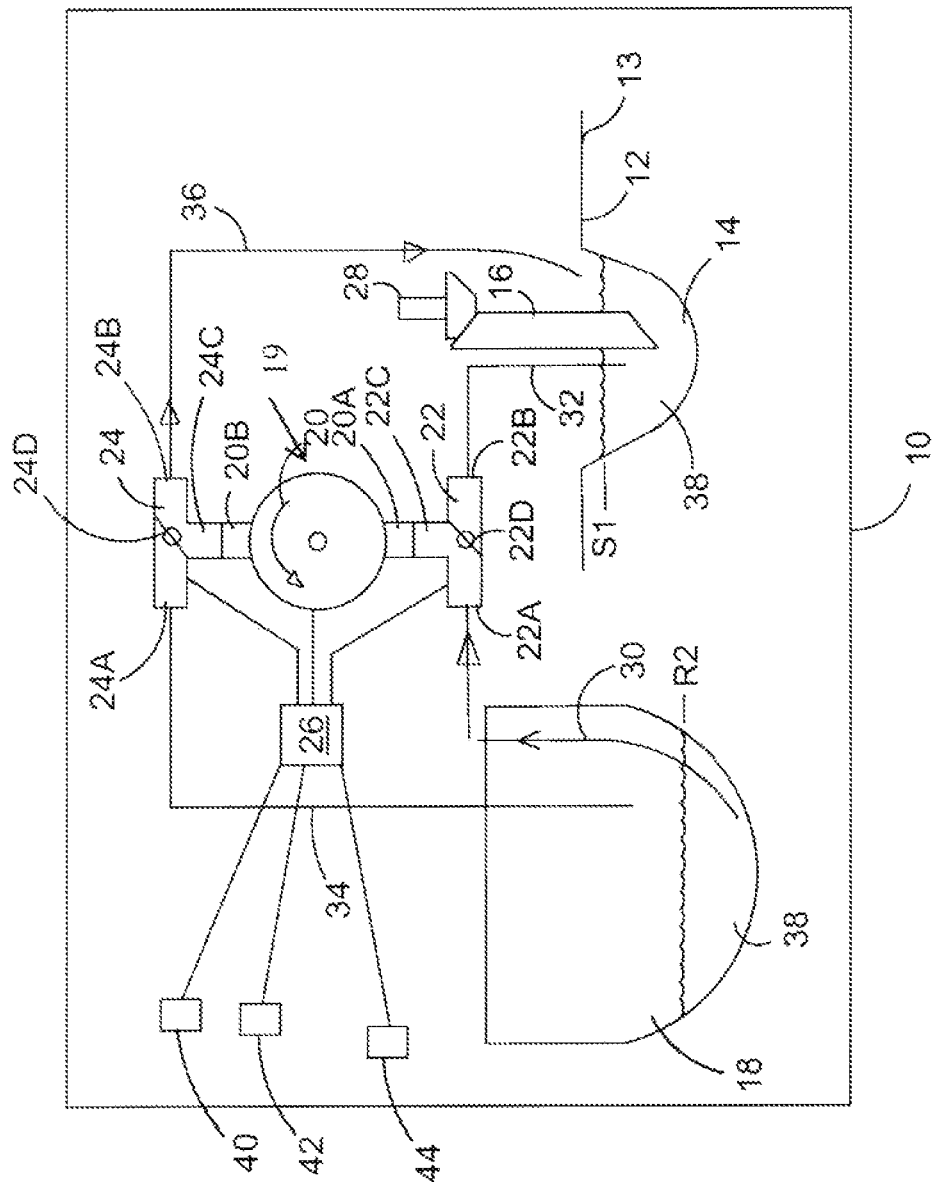
FIG. 1 is a schematic diagram showing a first embodiment of a transmission system according to the present invention.

With reference to FIG. 1, there is shown a transmission system 10 having an axle housing 12 with a sump 14. Rotatable in the axle housing 12 is a crown wheel 16, which is driven by a pinion 28.

The transmission system 10 also includes a fluid reservoir 18, a first valve 22, a second valve 24 and a control system including a controller 26. The transmission system 10 also includes a pump system 19 including a pump 20. The first valve 22 and the second valve 24 are flow diverter valves and operate as will be further described below.

An inlet 22A of the first valve 22 is in fluid communication with the reservoir 18 via a pipe 30. An inlet 22B of the first valve 22 is in fluid communication with the sump 14 via a pipe 32. An outlet 22C of the first valve 22 is in fluid communication with an inlet 20A of the pump 20.

An outlet 20B of the pump 20 is in fluid communication with an inlet 24C of the second valve 24. An outlet 24A of the second valve 24 is in fluid communication with the reservoir 18 via a pipe 34. An outlet 24B of the second valve 24 is in fluid communication with the sump 14 via a pipe 36.

The transmission system 10 includes a controller 26 which operates to control the pump 20, the first valve 22 and the second valve 24, as further described below.

In summary, oil 38 can be transferred between the sump 14 and the reservoir 18 depending upon the working conditions of the vehicle. Thus, when the crown wheel 16 is transferring high power and/or high torque, the system can transfer oil 38 from the reservoir 18 to the sump 14 to ensure proper cooling and lubrication. However, when the crown wheel 16 is only transmitting low or medium power and/or low or medium torque, oil 38 can be transferred from the sump 14 to the reservoir 18, thereby reducing the oil churning power losses caused by the crown wheel 16 rotating in the oil 38 in the sump 14.

An example of the crown wheel 16 transmitting high power and torque would be when the associated vehicle is a lorry, or truck, which is fully laden and is ascending a hill. An example of when the crown wheel 16 is transferring medium power and medium torque would be when the lorry was unladen and was driving along a flat road having a good surface (e.g., tarmac) at or below the legal speed limit.

Operation of the system is as follows. The controller 26 receives signals from sensors 40, 42 and 44 and/or other sensors (not shown). The sensors 40, 42 and 44 measure parameters which are indicative of the power and/or torque being transferred via the crown wheel 16. Thus, the sensors 40, 42 and 44 could measure pinion speed, engine speed, fuel consumption, throttle opening, or any other appropriate parameter. The sensor may measure the temperature of the oil 38, in particular the temperature of the oil 38 which is in the sump 14. When the controller 26 determines that more oil 38 is required for cooling/lubrication of the crown wheel 16, the pinion 28, differential gears and/or any associated bearings, then the pump 20 is started, the first flow diverter valve 22 is set to the position shown in FIG. 1, and the second flow diverter valve 24 is set to the position shown in FIG. 1. Under such circumstances, oil 38 is drawn from the reservoir 18 through the pipe 30 through the inlet 22A, through the outlet 22C, through the inlet 20A and through the pump 20, where the oil 38 is then pumped through the outlet 20B, through the inlet 24C, through the outlet 24B, through the pipe 36 and into the sump 14.

As can be seen in FIG. 1, a valve flap 22D is positioned so as to ensure the inlet 22A is in fluid communication with the outlet 22C, and that both the inlet 22A and the outlet 22C are fluidly isolated from the inlet 22B. Similarly, as shown in FIG. 1, a valve flap 24D is positioned so as to ensure the inlet 24C is in fluid communication with the outlet 24B and both the inlet 24C and the outlet 24B are fluidly isolated from the outlet 24A.

FIG. 1 shows the level of oil 38 in the sump 14 at a level S1 and the level of oil 38 in the reservoir 18 at a level R2. The controller 26 will stop the pump 20 at an appropriate time. The pump 20 could be stopped after a predetermined amount of time has elapsed from starting the pump 20 (e.g., one minute). Alternatively, the pump 20 could be stopped when the oil 38 level in the sump 14 has reached a predetermined level (e.g., the level S1). Alternatively, the pump 20 could be stopped when the oil level in the reservoir 18 has dropped to a predetermined level (e.g., the level R2).

Figure 2:
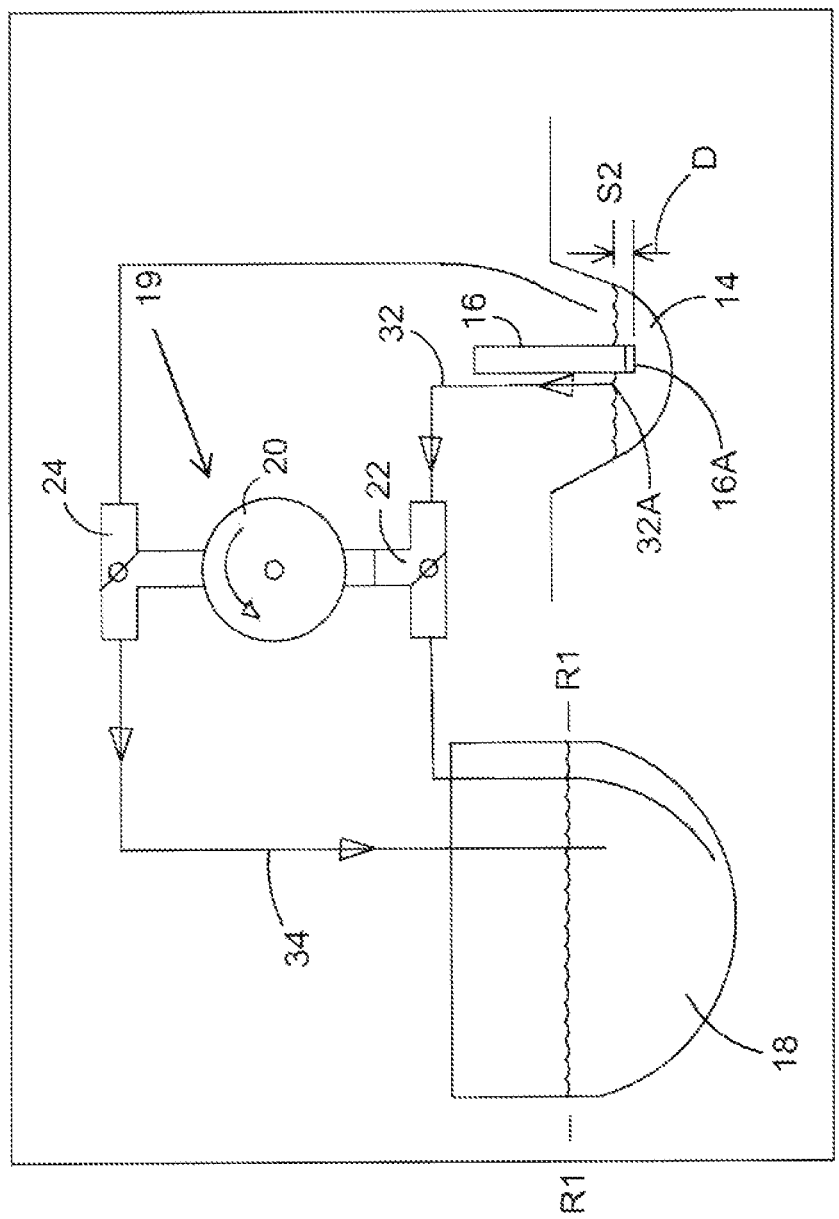
FIG. 2 is a schematic diagram of the embodiment of FIG. 1 shown in an alternate position.

When driving conditions change, and the controller 26 determines that less fluid is required in the sump 14, then the valve flaps 22D and 24D can be moved to the FIG. 2 position, and the pump 20 can be started. Under these circumstances, the pump 20 will draw fluid from the sump 14, through the pipe 32, through the first valve 22, and through the pump 20 where the fluid is then pumped through the second valve 24, through the pipe 34, and into the reservoir 18. As shown in FIG. 2, the level of oil 38 in the sump 14 is at a level S2, which is below the level S1 shown in FIG. 1. The level of oil 38 in the reservoir 18 is at a level R1, which is above the level R2 shown in FIG. 1.

The controller 26 will stop the pump 20 at an appropriate time. The pump 20 could be stopped after a predetermined amount of time has elapsed from starting the pump 20 (e.g., one minute). Alternatively, the pump 20 could be stopped when the oil level in the sump 14 has reached a predetermined level (e.g., the level S2). Alternatively, the pump 20 could be stopped when the oil level in the reservoir 18 has reached a predetermined level (e.g., the level R1).

The pipes 30 and 32 are suction pipes, and the open ends of the pipes 30 and 32 are relatively low within the reservoir 18 and the sump 14, respectively. The pipes 34 and 36 are pressure feed pipes, and the open ends of the pipes 34 and 36 need only direct the oil 38 towards the reservoir 18 and the sump 14, respectively, and the height of the ends of the pipes 34 and 36 is not important.

Advantageously, the end 32A of the pipe 32 is above the bottom 16A of the crown wheel 16. As shown in FIG. 2, the end 32A of the pipe 32 is situated by a distance D above the bottom 16A of the crown wheel 16. Such an arrangement ensures that when the oil 38 is being transferred to the reservoir 18, the oil level in the sump 14 cannot fall below the level of the end 32A of the pipe 32, and therefore this ensures that the bottom of the crown wheel 16 will always dip into the oil 38.

Figure 3:
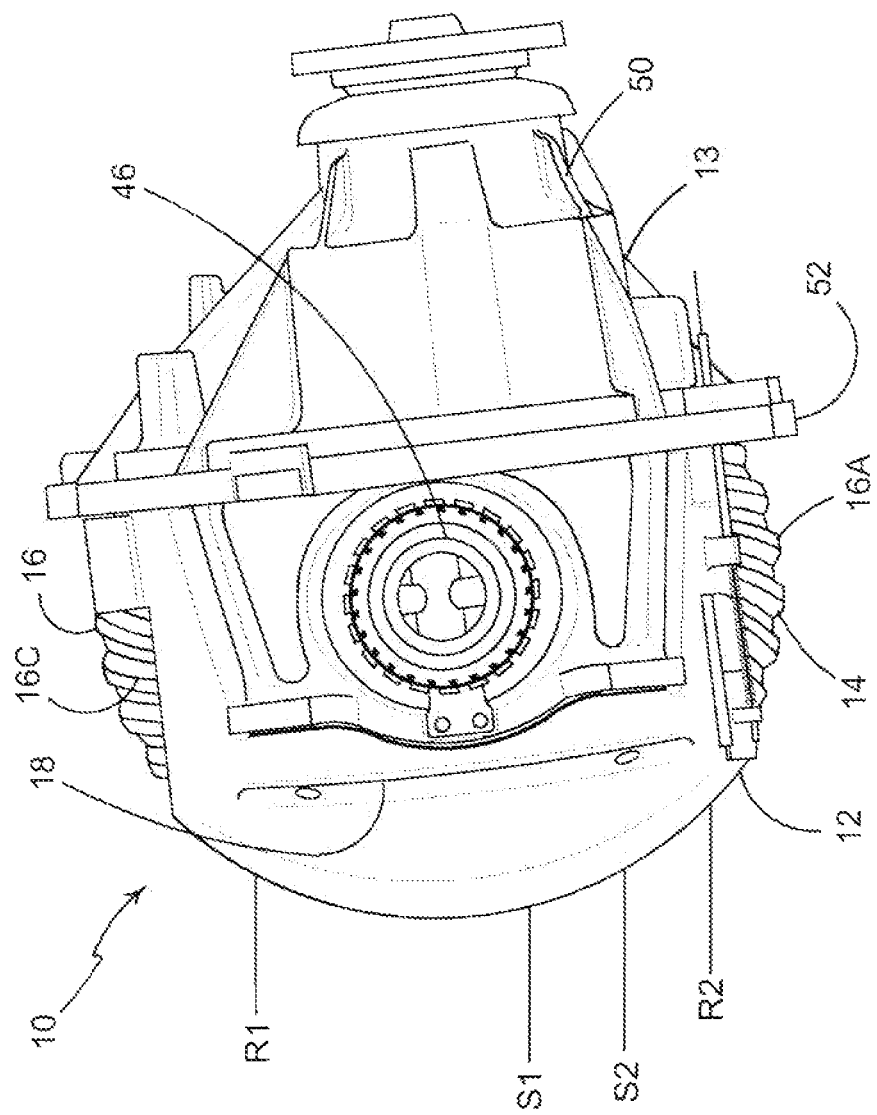
FIG. 3 is a side view of the embodiment shown in FIG. 1.
Figure 4:
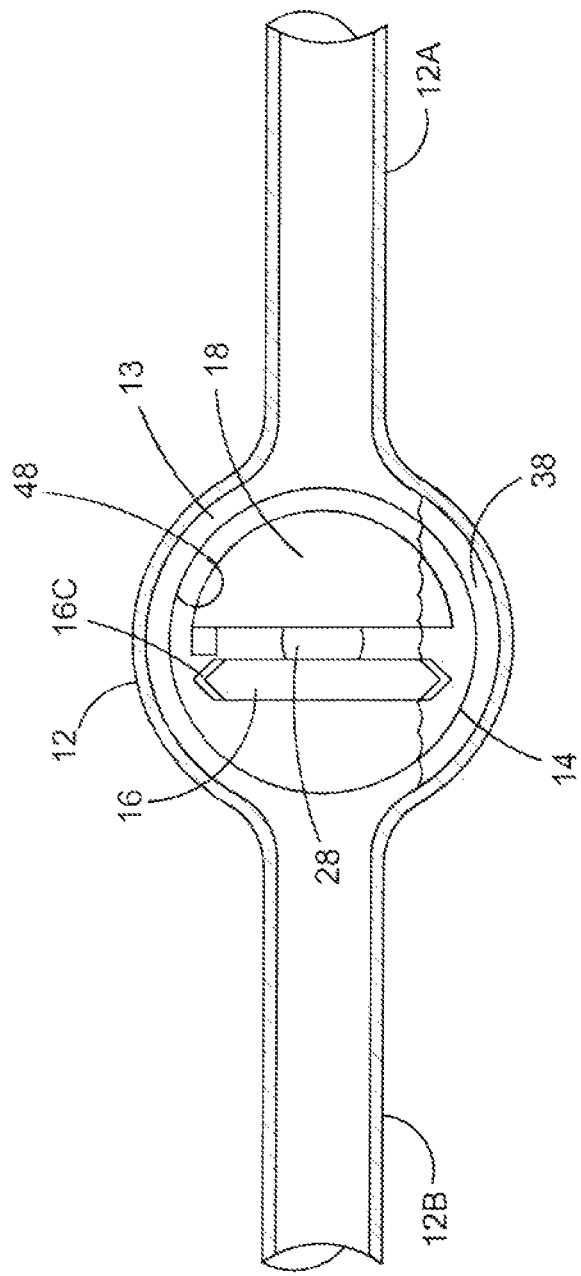
FIG. 4 is a schematic rear section view of the embodiment shown in FIG. 1.
Figure 5:
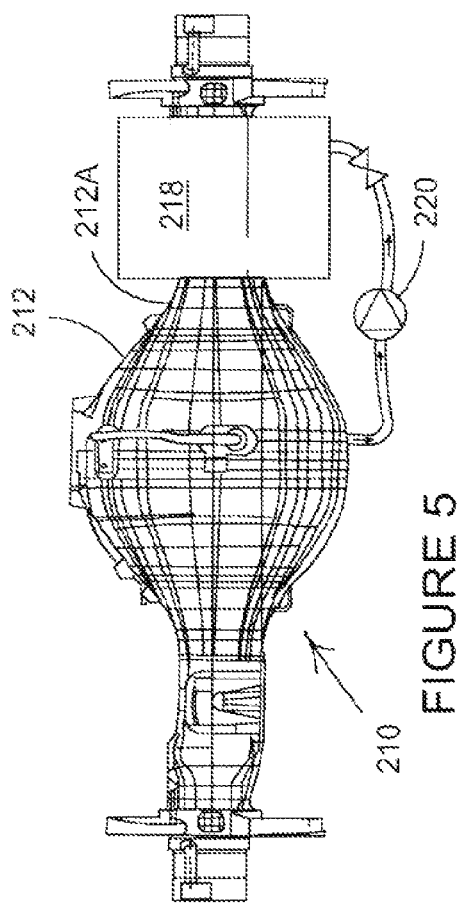
FIG. 5 is a second embodiment of a transmission system according to the present invention.

FIGS. 3, 4 and 5 show certain components of FIGS. 1 and 2 in their correct spatial relationship with each other.

As shown in FIG. 4, an axle housing 12 has two axle housing arms 12A and 12B which receive drive shafts (not shown). The pinion 28 is driven by a central drive shaft (not shown) and has teeth which engage teeth 16C on the crown wheel 16. The crown wheel 16 is attached to a differential assembly 46. The crown wheel 16 is positioned on one side of the differential assembly 46, and the teeth 16C face towards the pinion 28 and the axle housing arm 12A and therefore face away from the axle housing arm 12B.

The axle housing 12 includes a circular aperture 48 on a front face. A carrier 50 includes a flange 52 which, when bolted to the axle housing 12, substantially closes the circular aperture 48. The axle housing 12 and the carrier 50 so thus define the housing 13. Mounted on the carrier 50 is the pinion 28, the crown wheel 16, the differential assembly 46 together with associated bearings in a manner known in the art.

A right hand drive shaft (not shown) extends from the differential assembly 46 through the axle housing arm 12A, and a left hand drive shaft (not shown) extends from the differential assembly 46 through the axle housing arm 12B.

As is best seen in FIGS. 3 and 5, the reservoir 18 is C-shaped and faces the teeth of the crown wheel 16. The reservoir 18 is mounted on the carrier 50 as shown in FIG. 3. As shown in FIG. 3, the lower portion of the reservoir 18 is positioned below the level S2. It will also be appreciated from FIG. 3 that the bottom of the reservoir 18 is also positioned below the level S1. The C-shape of the reservoir 18 surrounds the right hand side of the differential assembly 46. In this case, the C-shape surrounds the right hand side of the differential assembly 46 by more than 180 degrees. Similarly, the C-shape surrounds the drive shaft, again by more than 180 degrees.

The pump 20 and the first valve 22 and the second valve 24 can be positioned at any convenient location. However, in one example, the valve is mounted on or in the reservoir 18. In one example, the first valve 22 is mounted on or in the reservoir 18. In one example, the second valve 24 is mounted on or in the reservoir 18. It will be appreciated that, depending upon the installation, one or more of the pipes 30, 32, 34 and 36 may not be required. Thus, when the inlet 22B of the first valve 22 is positioned at the level S2, then the pipe 32 is not required. Under such circumstances, when the height of the inlet 22B is the same as the height of the inlet 22A and the level S2 is the same as the level R2, then the pipe 30 is not required.

When the outlet 24B of the second valve 24 is positioned within the housing 13, then pipe 36 is not required. When the second valve 24 is positioned with the outlet 24A facing the reservoir 18, then the pipe 34 is not required.

When the bottom of the reservoir 18 is positioned in the axle housing 12 below either the level S1 or the level S2, then advantageously less oil 38 is required. This is because the reservoir 18 itself displaces the oil 38. By way of example, FIG. 3 shows the relative levels R1, R2, S1 and S2. In this case, the reservoir 18 is pumped dry, since the level R2 is at the bottom of the reservoir 18. When the reservoir 18 is pumped dry, the fluid level around the crown wheel 16 is at the level S1. By way of example, if the dry reservoir was removed, with the same amount of oil 38, the level S1 would fall since no oil 38 is being displaced by the empty reservoir 18.

Figure 6:
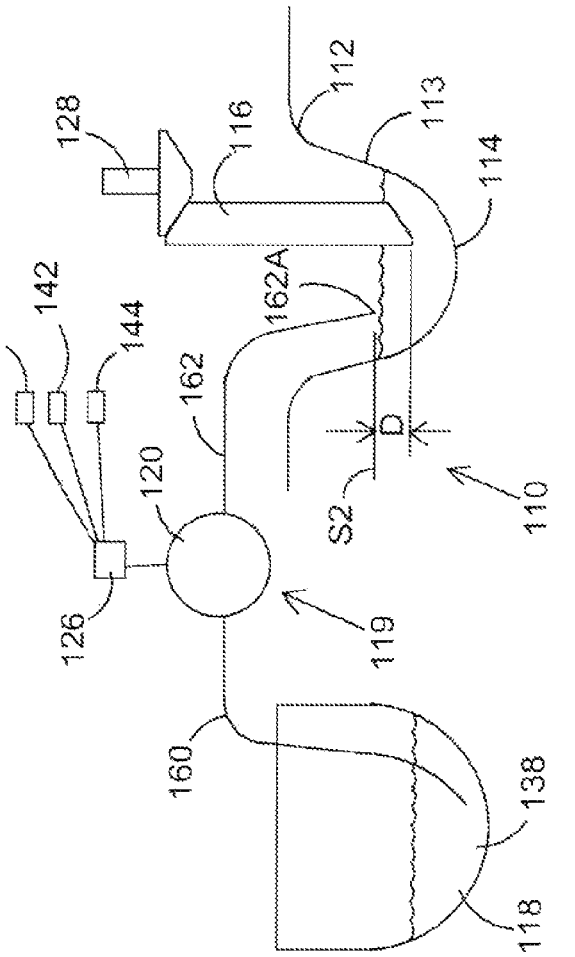
FIG. 6 is a schematic diagram showing a third embodiment of a transmission system according to the present invention.

FIG. 6 shows a schematic view of an alternative embodiment of a transmission system 110 according to the present invention. In this case, the pump 20 (operated in a single direction), the first valve 22 and the second valve 24 of FIG. 1 have been replaced by a pump system 119 having a pump 120 (operated in a reversible manner). A pipe 160 connects the pump 120 to the reservoir 118, and the pipe 162 connects the pump 120 to the sump 114.

The components of the transmission system 110 which fulfil the same function as those of the transmission system 10 are labelled 100 greater. In this case, when the sensor 126 determines more fluid is required in the sump 114, then the pump 120 is operated in a first direction to transfer fluid from the reservoir 118 to the sump 114. When the controller 126 determines that less oil 138 is required in the sump 114, then the pump 120 is operated in an opposite, reverse direction to transfer fluid from the sump 114 to the reservoir 118.

An end 162A is positioned at height D above a bottom of the crown wheel 116. In this manner, the sump 114 can only be emptied to the level S2, coincident with the level at which the end 162A of the pipe 162 is positioned in the sump 114. When sufficient oil 138 has been transferred either to the sump 114 or to the reservoir 118, the controller 126 stops the pump 120 as described above in relation to the controller 126. In one example, the reservoir 118 is shaped and positioned similarly to the reservoir 18. In particular, the reservoir 118 may be mounted on a carrier equivalent to the carrier 50. As described above, reservoirs 18 and 118 are both contained within the axle housing 12 and 112, respectively, and they are also contained within the housing 13 and 113, respectively.

Alternatively, the reservoir could be positioned externally relative to the axle housing. Thus, FIG. 5 shows a third embodiment of a transmission system 210 with components which fulfil the same function as those of the transmission system 110 labelled 100 greater. In this case, the reservoir 218 surrounds the axle housing arm 212A of the axle housing 212. The pump 220 is a reversible pump similar to the pump 120.

Figure 7:
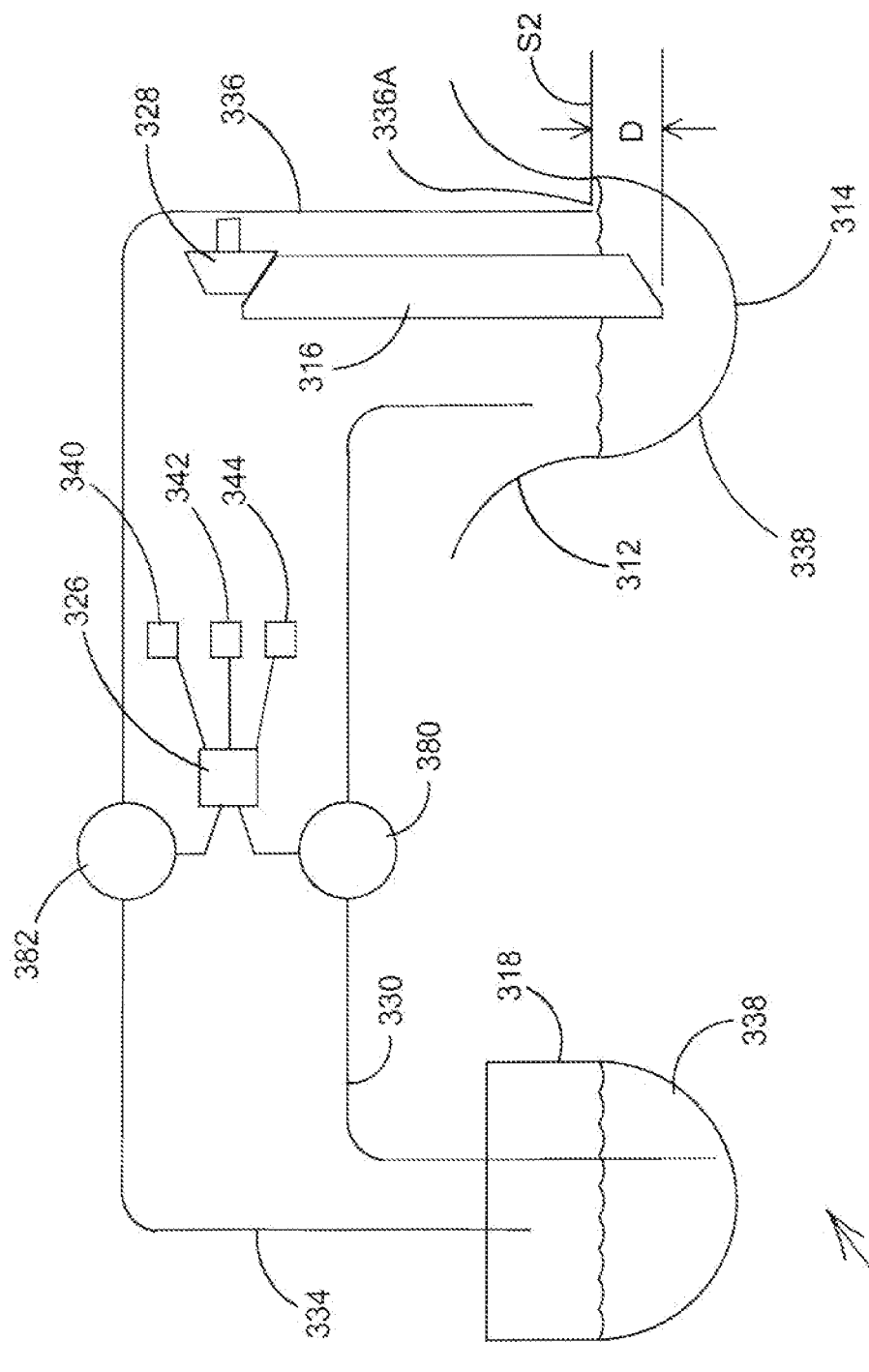
FIG. 7 is a schematic diagram showing a fourth embodiment of a transmission system according to the present invention.

FIG. 7 shows a further embodiment of a transmission system 310 according to the present invention in which components which fulfil substantially the same function as those of transmission system 10 are labelled 300 greater. In this case, rather than having a single pump and two valves as shown in FIG. 1, the system includes two pumps 380 and 382.

In this case, when the controller 326 determines that more fluid is required in the sump 314, then the pump 380 is operated. When the controller 326 determines that less oil 338 is required in the sump 314, then the pump 382 is operated.

The inlet end 336A of the pipe 336 is positioned at a distance D above the bottom of the crown wheel 316. In this way, when the pump 382 is operated, the sump 314 can only be emptied down to a level S2 coincident with the height of the bottom of the pipe 336. This level is positioned at a distance D above the bottom of the crown wheel 316. In this manner, a portion of the crown wheel 316 will always be submersed in lubricating oil 338.

When sufficient oil 338 has been transferred either to sump 314 or to the reservoir 318, the controller 326 stops the pump 382 as described above in relation to controller 26. The reservoir 318 can be shaped and positioned similar to the reservoir 18. Alternatively, the reservoir 318 can be shaped and positioned similarly to the reservoir 218.

As will be appreciated, the position of the reservoir is independent of the type of pumping system used. Thus, the single pump and twin valves of FIG. 1, or the reversible pump of FIG. 7, or the twin pumps of FIG. 8 can be used with a reservoir positioned as shown in FIG. 3, or as shown in FIG. 6, or as positioned in any other suitable location.

The pumps 20, 120, 220, 380, 382 can be any type of suitable pump. Furthermore, they can be driven by any suitable type of motor. In one example, the pumps are electrically powered pumps.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A method for controlling fluid level in a transmission system having a reservoir and a housing including a sump, the housing containing a crown wheel and a pinion, wherein a part of the crown wheel is received in a part of the sump, the method comprising:
    selectively transferring fluid from the reservoir to the sump to increase the fluid level to a first fluid level in the sump based on a first vehicle working condition;
    operating the transmission system at the first fluid level;
    selectively transferring fluid from the sump to the reservoir to decrease the fluid level to a second fluid level in the sump based on a second vehicle working condition; and
    operating the transmission system at the second fluid level;
    wherein selectively transferring fluids includes connecting a pump to one of the reservoir and the sump via a first flow diverter valve upstream from the pump, and connecting the pump to the other of the reservoir and the sump via a second flow diverter valve downstream from the pump.

2. The method of claim 1, wherein selectively transferring fluid from the sump to the reservoir decreases the fluid level in the sump only to a level above a bottom of the crown wheel.

3. The method of claim 1, wherein the first vehicle working condition includes the crown wheel transferring a first power and/or torque level and the second vehicle working condition includes the crown wheel transferring a second power and/or torque level that is less than the first power and/or torque level.

4. The method of claim 1, wherein the first vehicle working condition includes a vehicle loaded condition or an inclination ascending condition.

5. The method of claim 1, wherein the second vehicle working condition includes a vehicle unloaded condition or a non-inclination ascending condition.

6. The method of claim 1, further comprising receiving signals indicative of the power and/or torque being transferred by the crown wheel.

7. The method of claim 1, wherein selectively transferring fluid includes stopping the pump after a predetermined amount of time has elapsed.

8. The method of claim 1, wherein selectively transferring fluid includes stopping the pump when the fluid level in the sump has reached a predetermined level.

9. The method of claim 1, wherein selectively transferring fluid includes stopping the pump when the fluid level in the reservoir has reached a predetermined level.

10. A method for controlling fluid level in a transmission system having a reservoir and a housing including a sump, the housing containing a crown wheel and a pinion, wherein a part of the crown wheel is received in a part of the sump, the method comprising:
    pumping fluid from the reservoir to the sump to increase the fluid level to a first fluid level in the sump based on a first vehicle working condition;
    operating the transmission system at the first fluid level;
    pumping fluid from the sump to the reservoir to decrease the fluid level to a second fluid level in the sump based on a second vehicle working condition, wherein the second fluid level is above a bottom of the crown wheel; and
    operating the transmission system at the second fluid level;
    wherein pumping fluids includes connecting a pump to one of the reservoir and the sump via a first flow diverter valve upstream from the pump, and connecting the pump to the other of the reservoir and the sump via a second flow diverter valve downstream from the pump.

11. The method of claim 10, wherein the first vehicle working condition includes the crown wheel transferring a first power and/or torque level and the second vehicle working condition includes the crown wheel transferring a second power and/or torque level that is less than the first power and/or torque level.

12. The method of claim 10, wherein the first vehicle working condition includes a vehicle loaded condition or an inclination ascending condition.

13. The method of claim 10, wherein the second vehicle working condition includes a vehicle unloaded condition or a non-inclination ascending condition.

14. The method of claim 10 wherein pumping fluid includes stopping the pump when the fluid level in the sump has reached a predetermined level, the predetermined level being one of the first and second levels, and wherein the transmission is operated at one of the first and second levels while the pump is stopped.

* * * * *